United States Patent [19]

Thoma

[11] 4,327,286
[45] Apr. 27, 1982

[54] METHOD AND APPARATUS FOR MEASURING THE RISK OF ICE FORMATION

[75] Inventor: Andreas Thoma, Germering, Fed. Rep. of Germany

[73] Assignee: Apparatebau Gauting GmbH, Gauting, Fed. Rep. of Germany

[21] Appl. No.: 166,167

[22] Filed: Jul. 7, 1980

[30] Foreign Application Priority Data

Jul. 12, 1979 [DE] Fed. Rep. of Germany ....... 2928208

[51] Int. Cl.³ .............................................. G01W 1/00
[52] U.S. Cl. ................................. 250/231 R; 340/583
[58] Field of Search ...................... 250/231 R; 340/583

[56] References Cited

U.S. PATENT DOCUMENTS 2,359,787 10/1944 Peters et al. .
3,543,577 12/1970 Pavlov et al. .
3,621,714 11/1971 Puccinelli .

FOREIGN PATENT DOCUMENTS 2707009 8/1978 Fed. Rep. of Germany .
2732066 1/1979 Fed. Rep. of Germany .

Primary Examiner—David C. Nelms
Assistant Examiner—Darwin R. Hostetter
Attorney, Agent, or Firm—Wegner, Stellman, McCord, Wood & Dalton

[57] ABSTRACT

Method and apparatus for measuring conditions affecting susceptibility of a surface to ice formation, as for an aircraft. Detection surfaces are provided with cooling and heating elements. At least a portion of a detection surface is cooled below the ambient to cause ice to form. The temperature of ice formation and the time required for ice to build up provide measures of the risk of icing.

18 Claims, 6 Drawing Figures

METHOD AND APPARATUS FOR MEASURING THE RISK OF ICE FORMATION

The invention relates to a method of recognizing a risk of icing on a surface subject to a temperature variation, as on airplane surfaces, and also to an ice warning sensor for implementing the method.

It is known that, particularly in the case of airplanes, the formation of ice on the aircraft skin and the wings can be the cause of considerable hazards. For this reason ice detectors have been developed which detect the appearance of ice on the aircraft skin.

For example, the U.S. Pat. No. 2,359,787 discloses an ice detector which has a glass detection surface onto which light is beamed. This detector operates according to the principle of Snell's law. If ice forms on the detection surface, the overall optical density of the detection surface (glass and ice) changes so that the angle of refraction of the beamed light is altered. Arranged in the vicinity of the detection surface is a light detector which receives less light when ice has formed and is thus able to indicate ice formation.

The disadvantage of this ice detector is that it responds only when ice has actually formed on the airplane surface. However, an ice detector is desirable, especially for aircraft, which indicates that ice formation is imminent and emits a corresponding warning before ice has actually formed.

The German Offenlegungsschrift Nos. 27 07 009 and 27 32 066 now disclose an ice warning sensor which enables a risk of ice formation to be predicted. This ice warning sensor is based on the idea that the formation of ice is not dependent merely on temperature but also substantially on the water content of the air. The water may occur in the air in which an airplane is traveling, in the form of fog, clouds or rain. The lower the temperature of the air, the less water the air is capable of absorbing. In turn, the less water the air contains, the less possibility there is of icing. Thus, on the one hand falling temperatures favor ice formation and on the other hand the water content of the air falls at lower temperatures so that in turn the likelihood of icing is reduced. This leads to a maximum ice formation probability at a temperature of approximately minus 5 degrees to minus 8 degrees Centigrade. The exact position of the maximum depends on the water content of the air. In the case of the ice warning sensor known from the German Offenlegungsschrift Nos. 27 07 009 and 27 32 066, a detection surface is cooled artifically to different temperatures at adjacent points. According to the temperature of each of these detection surfaces, it takes a varying length of time for a layer of ice to form thereon. The faster the formation of the covering of ice, the greater the probability of ice formation. The ice detector described here measures the time required for a layer of ice to form on the detection surfaces and in this way obtains a measure of the dependency of the time required for icing on the temperature of the detection surfaces. This function may be extrapolated to the actual temperature of the airplane surface which is higher than the temperature at the artificially cooled points. From the extrapolation it is possible to determine how thick the layer of ice would be if the airplane were maintained for a specific length of time in the environment present at that instant. This method therefore makes predictions possible and may be used for a warning before the dangerous ice formation state is actually reached.

The ice warning sensors described in the aforementioned German Offenlegungsschrift Nos. 27 07 009 and 27 32 066 make a true warning possible before ice has formed on the airplane surface. The evaluation circuit described therein is, however, relatively expensive and complicated.

An object of this invention is to provide a method of recognizing a risk of icing, which is simpler than known methods and which, in particular, enables the ice warning sensor to be of simple construction.

A further object is provision of a simply constructed and reliable ice warning sensor, which includes cooling two detection surfaces to different temperatures, measuring the time for each surface to ice over and determining the temperature of the iced over detection surfaces and of the surface for which risk of icing is to be evaluated.

Corresponding to the mode of operation from German Offenlegungsschrift Nos. 27 07 009 and 27 32 066, a temperature at which ice formation occurs is produced artificially on a detection surface with the method of the invention. The speed of ice formation s on a structure is given by $$s = (\Delta d_E / \Delta t)$$

wherein $\Delta d_E$ signifies the increase of the thickness of the coating of ice and $\Delta t$ signifies the time interval during which the thickness increase occurs.

In order now to achieve an early warning for the purposes of a forecast, this ice formation speed is determined on a surface which is at a lower temperature, and, therefore, affords better conditions for ice formation than the rest of the aircraft skin. By extrapolation of this "artificial" ice formation speed, the speed of ice formation on the aircraft skin with the actual temperature $T_F$ can be determined. If, for example, the temperature of a first detection surface $T_1$ is less than the temperature $T_2$ of a second detection surface and this in turn is less than the temperature $T_F$ of the aircraft skin, then the times taken by the respective surfaces to ice over with the same layer thickness $\Delta d_E$ will be less than $\Delta t_F$ or generally expressed $\Delta t_1$ less than $\Delta t_2$:

$$\Delta t_1 < \Delta t_2 < t_F$$

At the temperature $T_1$ and discounting therms higher than the first order, a Taylor series development of this function produces for the ice formation time $$\Delta t(T_1) = \Delta t(T_F) + \frac{d\Delta t}{dT} \Delta T,$$

to that $$\Delta t(T_F) = \Delta t(T_1) - \frac{d\Delta t}{dT} \Delta T$$

is obtained for the time span $\Delta t(T_F)$ to be determined.

In this equation the values appearing on the righthand side are all known.

The method according to the invention now aims to determine the times $\Delta t(T_1)$ and $\Delta t(T_2)$. As soon as the elements used for controlling the temperature of the detection surfaces are switched to cooling, a time measurement is begun according to the invention for each detection surface and is then stopped when a layer of ice has formed on the surface. Thus, the times $\Delta t(T_1)$ and $\Delta t(T_2)$ are determined. If, in addition, the temperatures $T_1$ and $T_2$ are measured, the gradient $(d/dT)(\Delta t)$ and also the temperature difference $\Delta T = T_1 - T_F$ can be determined. The speed of ice formation at the airplane surface temperature T is then $s = P \cdot [1/\Delta t(T_F)]$, in which P is a proportionality factor.

Basically two types of operation, i.e., an intermittent and a continuous operation, are possible for determining the ice formation tendency.

With the intermittent type of operation, two or more detection surfaces are scanned by means of a radiation source for an accumulation of ice. If ice has formed on the detection surface, the intensity of the light directed onto it and back-scattered by the ice layer is greater than if there is no ice formation, so that the voltage produced is greater at the light detector than a determined threshold value. This is utilized for the time measurement as the time measurement starts when the elements used for cooling the detection surfaces are switched on and is stopped when the detector exceeds a certain threshold value. The contents of a counter are transmitted to a store. Thus, after ice formation has begun there is available at the output of each unit assigned to a single detection surface a time $\Delta t$ which is dependent on an instantaneous equilibrium in the heat balance between the amount of heat supplied by the atmosphere and the amount of heat conducted off by the cooling element. As the thickness of the ice layer on each detection surface is of equal depth when the threshold value circuit responds, it is possible to determine the speed of icing and the risk of icing, respectively. Following this, the detection surfaces are heated so that the ice layer disappears again and the ice warning sensor is, therefore, again ready for operation.

A further method provided by the invention makes a continuous mode of operation possible. In this case the detection surface is cooled or heated respectively from two sides. When the corresponding elements have constant heat and cooling power respectively, the boundary layer between water and ice on the detection surface is dependent on the amount of heat supplied or conducted off by the atmosphere and the cooling power applied by the cooling element. According to the invention this cooling power is now adjusted so that the boundary layer is always located in the same place. When ice occurs at this position, it is also detected by an optical ice recognition threshold value circuit. The regulated cooling power emitted by the cooling element or its additionally consumed electrical power is proportional to the prevalent ice formation conditions. If, now, the cooling power necessary to maintain the water-ice boundary layer or the corresponding power consumption of the cooling element respectively changes, the speed of ice formation can then be determined from this. From this magnitude it is then possible to make a prediction about the risk of icing on the aircraft skin in the respective environment.

The method according to the invention and also the ice warning sensor used for its implementation are now described and explained in more detail in the following with reference to preferred exemplary embodiments and the Figures.

Figure 1:
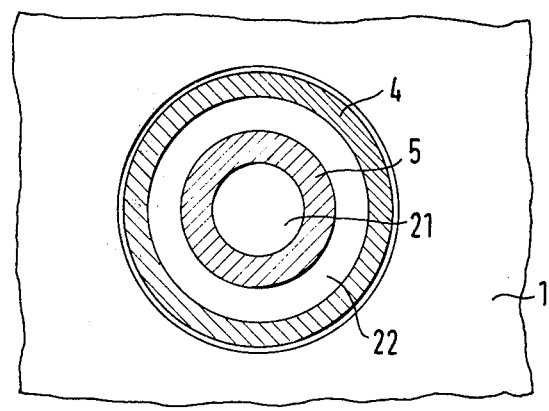
FIG. 1 is a plan view of the detection surfaces of an ice warning sensor according to the invention.

FIG. 1 shows a section from the airplane skin 1, let into which is an ice warning sensor. This consists of two detection surfaces 21, 22 which are each enclosed by an annular Peltier element 5 or 4 respectively. These Peltier elements may be used both for cooling and heating the detection surfaces they enclose, simply by reversing the current sources from which they are driven. The Peltier elements are operated so that a lower temperature is produced with the Peltier element 5 than with the outer Peltier element 4.

Figure 2:
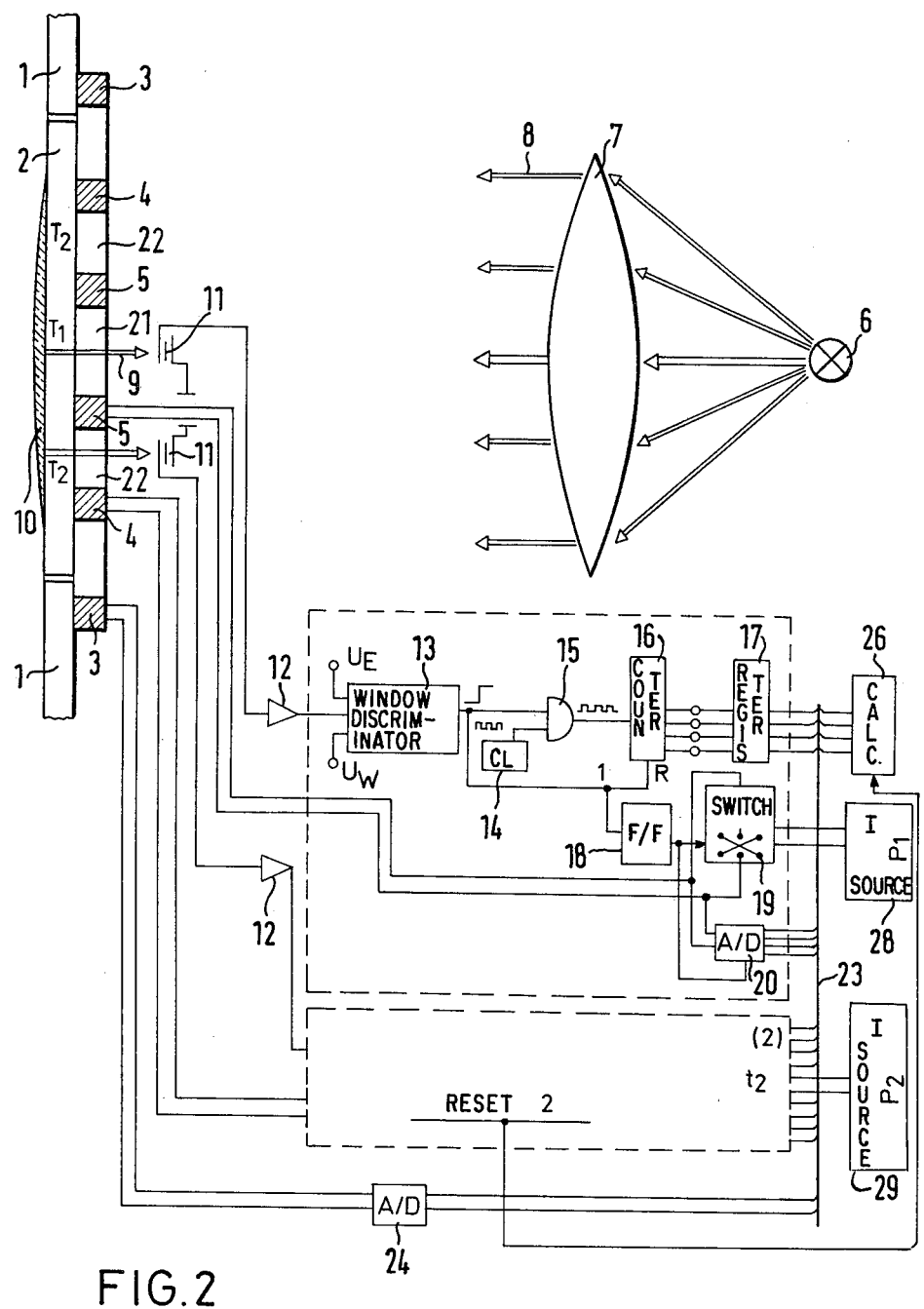
FIG. 2 is a diagrammatic illustration of an ice warning sensor and evaluation circuit.
Figure 6:
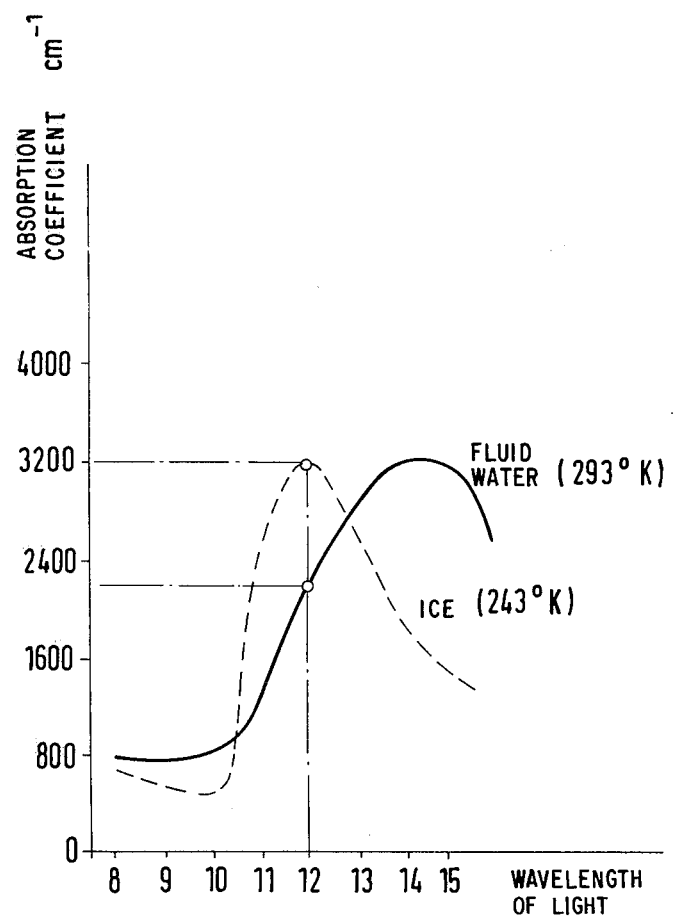
FIG. 6 is a plot of the refractive indices or absorption coefficients of ice and of water as a function of the wave length of the light.

FIG. 2 shows an ice warning sensor used for an intermittent mode of operation. The detection surface 2 is let into the aircraft skin 1. As in FIG. 1, the Peltier element 4 and 5 are of annular construction so that they enclose an annular detection surface 22 and a circular detection surface 21. Light is emitted by a light source 6 and falls onto the detection surfaces 21, 22 via a lens 7. At the beginning of the measuring cycle the current sources 28, 29 are connected and applied to the Peltier elements 4 or 5 respectively so that they cool the detection surfaces. In this connection the detection surface 21 is cooled more strongly than the detection surface 22. Arranged in front of the detection surfaces are light sensors 11 which are connected to a window discriminator 13 via an amplifier 12. As the reflection capacity of water in a specific optical region is less than the reflection capacity of ice, the window discriminator 13 has a Hi signal at its output providing that no ice has formed. The output of the window discriminator 13 is connected to one input of an AND gate 15. The output of a clock pulse generator 14 is connected to the other input of this AND gate. If, therefore, there is no ice on the detection surface, the clock pulses are conducted through AND gate 15 to the counter 16. If, as a result of the cooling, an ice layer 10 forms on the detection surface 21, the refractive index alters according to FIG. 6 so that the light sensor 11 now receives more light. This leads to the window discriminator switching over to a Lo signal at its output, if the output voltage of the amplifier 12 which is supplied to the input of the window discriminator 13 is higher than a upper threshold voltage $U_E$. Thus, the AND gate 15 is blocked so that the counter receives no more time pulses. The state of the counter 16 is transmitted to a register 17 so that here it may be read off or further processed. The Lo signal of the window discriminator also switches over a flip-flop 18 which in turn operates a selective switch 19. By means of this selective switch 19 the Peltier element 5 is switched over from cooling operation to heating operation. Between these two switching states, however, the Peltier element passes through an idle operation during which it may be used as a thermocouple so that it may be used to determine the temperature of the detection surface 21. The thermoelectric voltage emitted by the Peltier element in this state is converted into digital value with the aid of an analog-digital converter 20. After the switch 19 has then switched the Peltier element over to heating, the capacity of ice, the window discriminator 13 has a Hi signal at its output providing that no ice has formed. The output of the window discriminator 13 is connected to one input of an AND gate 15. The output of a clock pulse generator 14 is connected to the other input of this AND gate. If, therefore, there is no ice on the detection surface, the clock pulses are conducted through AND gate 15 to the counter 16. If, as a result of the cooling, an ice layer 10 forms on the detection surface 21, the refractive index alters according to FIG. 6 so that the light sensor 11 now receives more light. This leads to the window discriminator switching over to a Lo signal at its output. Thus, the AND gate 15 is blocked so that the counter receives no more time pulses. The state of the counter 16 is transmitted to a register 17 so that here it may be read off or further processed. The Lo signal of the window discriminator also switches over a flip-flop 18 which in turn operates a selective switch 19. By means of this selective switch 19 the Peltier element 5 is switched over from cooling operation to heating operation. Between these two switching states, however, the Peltier element passes through an idle operation during which it may be used as a thermocouple so that it may be used to determine the temperature of the detection surface 21. The thermoelectric voltage emitted by the Peltier element in this state is converted into a digital value with the aid of an analog-digital converter 20. After the switch 19 has then switched the Peltier element over to heating, the detection surface 21 is heated until the ice layer 10 has disappeared. The detection surface 21 is prepared in this way for a new cycle. When water appears on the detection surface, the window discriminator 13 again switches to the output signal Hi if the output voltage of the amplifier 12 which is supplied to the input of the window discriminator 13 is lower than a lower threshold voltage $U_W$ so that the time pulses of the clock pulse generator 14 again reach the input of the counter 16 via the AND gate 15.

The type of operation of the detection surface 22 and the associated Peltier element 4 is exactly the same as the mode of operation of the Peltier element 5 and the appertaining detection surface 21 which has just been described. The only difference is that the Peltier element 4 and thus the detection surface 22 are cooled less strongly than the detection surface 21. Also, with the ice warning sensor according to FIG. 2, the temperature of the airplane surface 1 is measured with a thermocouple 3. The voltage emitted by this thermocouple 3 is also converted into a digital value by an analog-digital converter 24. A calculating unit 26 is used in order to facilitate the evaluation. More particularly, the output date of the analog-digital converter 20 or 24 respectively and also the counter states of the counter 16 held in the stores 17 and also the power consumption of the Peltier elements 4 or 5 respectively are supplied to the appertaining data line 23. The ice formation probability is then calculated and displayed by means of the calculator 26.

It should also be mentioned that the temperatures of the detection surfaces are selected so that the ice formation probability for them is relatively high. Thus, for example, the temperature $T_1$ of the detection surface 21 is selected at minus 4 degrees Centigrade and that of the detection surface 22 $T_2$ is also selected at just minus 2 degrees Centigrade.

Figure 3:
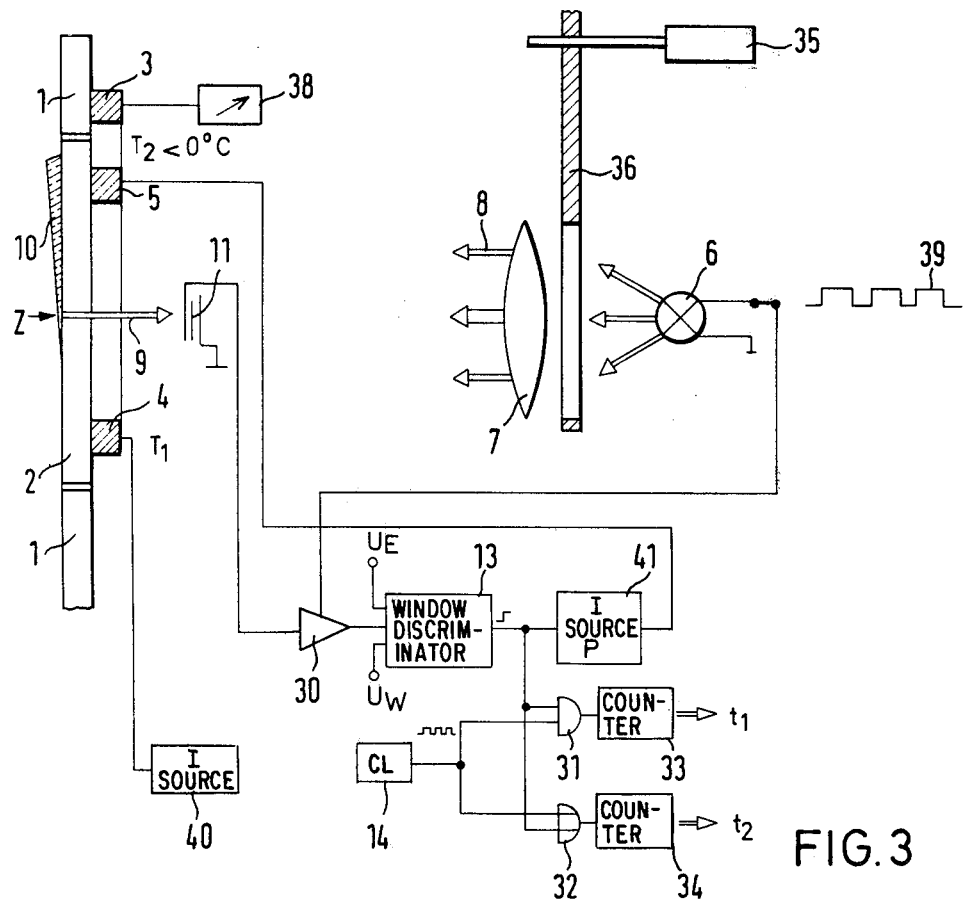
FIG. 3 is a diagrammatic illustration of a further ice warning sensor and evaluation circuit.

FIG. 3 shows another ice warning sensor which operates in a continuous operation. Two Peltier elements 4 or 5 respectively are arranged on the detection surface 2. The Peltier element 4 is operated from a current source 40 and heated to a temperature of, for example, more than 30° C. The Peltier element 5 is used for cooling and is cooled by an adjustable current source 41 to a temperature of below 0° C. Light 8 is thrown onto the detection surface 2 by a light source 6 via a lens 7. As long as no ice has formed in the center Z of the detection surface 2, the light sensor 11 receives less back-scattered light 9 so that the window discriminator 13 shows Hi signal at its output. This output of the window discriminator controls the current source 41 and causes it to cool the Peltier element further. At the same time the output signal of the window discriminator is applied to an AND gate 31 and an Exclusive OR gate 32. If the window discriminator shows Hi signal at its output, time pulses of a clock pulse generator 14 are transmitted via the AND gate 31 to a counter 33. If now an ice layer 10 is formed in the center of the detection surface 2 as a result of the further cooling of the Peltier element 5 caused by the current source 41, then more light 9 is back-scattered into the light sensor 11. The signal of the light sensor 11 amplified by the amplifier 13 is applied to the input of the window discriminator 13 and as a result this switches over to the Lo signal at its output. Current from source 41 to Peltier element 5 is cut off. The time pulses of the clock pulse generator 14 are no longer transmitted from the AND gate 31 to the counter 33 and, on the other hand, as a result of this signal the time pulses of the clock pulse generator 14 are transmitted from the Exclusive OR gate 32 to the counter 34. The counter 33 thus measures the time during which the current source 41 is switched on for cooling the Peltier element 5, while counter 34 measures the time during which the current source 41 is switched off. As the Peltier element 5 is no longer cooled when the Lo signal is applied to the output of the window discriminator 13, the ice-water boundary layer in FIG. 3 is displaced upwards so that now no back-scatter light 9 falls into the light sensor 11. In this way the window discriminator 13 again switches to the Hi value at its output so that the current source 41 is once more switched on. Thus, by means of the synchronous connection and disconnection of the Peltier element 5, the boundary layer of ice and water is kept in the center Z of the detection surface 2.

Figure 4:
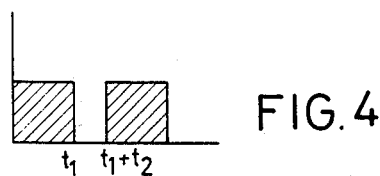
FIG. 4 is a timing diagram illustrating the evaluation method of the ice warning sensor according to FIG. 3.

FIG. 4 illustrates the mode of operation of the Peltier element 5. The relationship of the switch-on time $t_1$ to the time $t_2$ at which the Peltier element is not operated and the current source 41 is thus switched off, provides a measure for the cooling power supplied to the Peltier element 5 and thus indirectly a measure for the ice formation probability.

Furthermore, a thermocouple 3 is applied to the airplane skin 1, the thermocouple voltage of which is converted by, for example, an analog-digital converter 38 into a digital value and displayed. In a corresponding manner, as in the case of the exemplary embodiment represented in FIG. 2, the digital values emitted by the counters 33 and 34 and also by the analog-digital converter 38 can be supplied to a calculator so that this determines and displays the ice formation probability.

In order to avoid effects of light-scatter, provision may be made, for example, for the light source 6 to be operated with an alternating frequency so that the back-scattered light 9 also pulses with this frequency. This alternating frequency is also supplied to a control input of the amplifier 30 so that only those signals of the light sensor 11 which are in correct phase are detected and transmitted to the input of the window discriminator 13.

Instead of operating the light source with an alternating frequency, provision may also be made to alter the light emitted by the light source 6 periodically with the aid of a synchronous motor 35 and a perforated disc 36. Also, in this case the amplifier 30 may be controlled by, for example, the synchronous motor 35 or by a reference beam so as to eliminate light scatter effects.

Figure 5:
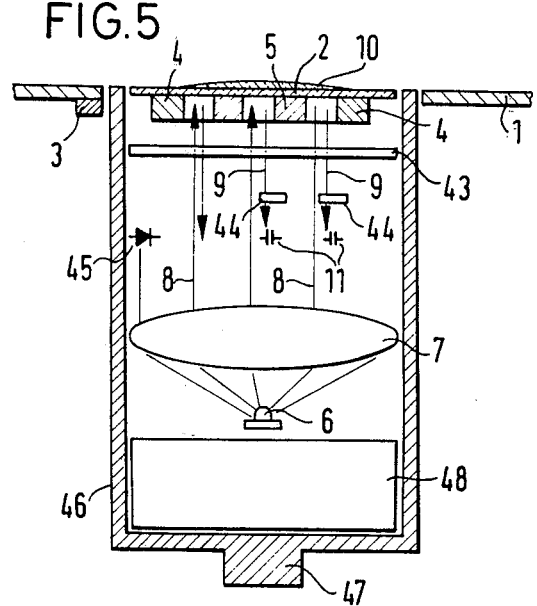
FIG. 5 shows the construction of an ice warning sensor.

FIG. 5 shows the arrangement of an ice warning sensor. The detection surface 2 is inserted into the airplane skin 1. The annular Peltier elements 4 or 5 respectively are located on the surface. Light emanates from the light source 6 and is thrown onto the detection surface via a lens 7. The light sensors 11 receive the light 9 back-scattered by the ice layers 10. Furthermore, a photo-diode 45 may be provided which monitors the constancy of the light intensity as a reference element. With the aid of optical filters 44 which are arranged in front of the light sensors 11, the back-scattered light 9 can be filtered and thus the displays of the light sensors 11 are improved. Also, a fluid crystal 43 can be arranged between the light sensors 11 and the detection surface, which, with a corresponding mode of operation, also back-scatters light into the sensors 11 and can thus simulate the presence of ice on the detection surface 2. The entire ice warming sensor is enclosed by a housing 46. Located in its lower section is the electronic unit 48. This electronic unit 48 may be connected via a terminal 47 to a suitable remote indicator.

The following components in particular may be used for the exemplary embodiments represented in FIGS. 2 and 3:

| Component | Manufacturer and Model |
|---|---|
| Peltier Element | NSI 5 AD |
| Light Sensor with Amplifier | ELTEC 404 |
| Window Discriminator | Siemens TCA 965 |
| Clock Pulse Generator | Fairchild μA 555 |
| AND gate | Motorola MC 14081 |
| Counter | Motorola MC 14520 B |
| Stores | Motorola MCM 14505 MCM 14503 MC 14529 |
| Flip-flop | Motorola MC 14013 B |
| Analog-digital converter | Ferranti ZN 427 |
| Current source | Silicon General SG 123 |
| Calculator | RCA Cosmac CDP 1802 |

I claim:

1. The method of recognizing a risk of icing on a surface subject to continuous or graduated temperature varitation in which the icing over of the surface is detected by directing light on the surface and measuring the light back-scattered by ice, and characterized by:
    cooling two detection surfaces to different temperatures;
    measuring the times within which the detection surfaces ice over after cooling has begun; and
    determining the temperature of the detection surfaces in the iced-over state and the temperature of said first mentioned surface, the risk of icing being determined in terms of time of the ice formation at points of different temperature.

2. The method of claim 1, characterized in that after the onset of ice formation on the detection surfaces and the measurement of the time taken for the ice to form and the temperature of the detection surfaces, the detection surfaces are heated in order to crack off the ice.

3. A method of recognizing a risk of icing on a surface, characterized by:
    producing a temperature gradient over a detection surface by supplying heating or cooling power to two heating-cooling elements so that the detection surface has an ice-free region and an ice-covered region;
    regulating heating or cooling power of one of the elements so that the boundary layer between the ice-free and the iced-over region of the detection surface remains stationary.

4. In an ice warning sensor for implementing a method according to claim 1 or 3 having at least one detection surface;
    heating-cooling elements associated with said surface;
    current sources connected with said heating-cooling elements for producing prescribed temperatures in the region of the detection surfaces;
    a light source for lighting the detection surfaces;
    means for measuring back-scattered light which is back-scattered by ice layers located on the detection surfaces;
    a sensor circuit comprising:
    a discriminator having an input connected with each light measuring means;
    a source of clock pulses;
    a counter; and
    a gate controlled by the output of said discriminator for connecting pulses from said clock to said counter.

5. An ice warning sensor according to claim 4, characterized by a temperature measuring device for determining the temperature of the airplane surface and by further temperature measuring devices for determining the temperature of the detection surfaces.

6. An ice warning sensor according to claim 4, characterized in that the cooling-heating elements are Peltier elements.

7. An ice warning sensor according to claim 4, characterized in that the temperature measuring device is a thermocouple.

8. An ice warning sensor according to claim 4, characterized in that the output of the discriminator is connected to the input of a switch for switching over the mode of operation of the cooling-heating element.

9. An ice warning sensor according to claim 4, characterized in that there is a storage register for storing the counter state of the counter.

10. An ice warning sensor according to claim 8, characterized in that said switch has a condition in which said heating-cooling elements are idle and function as a thermocouple, and in which analog-digital converters are connected to the heating-cooling elements.

11. An ice warning sensor of claim 10, characterized in that there is a calculating unit which receives as input data the counter state of the counter and the output of the analog-digital converter.

12. An ice warning sensor according to claim 6, characterized in that the Peltier elements are closed in a ring-like manner and enclose the detection surfaces.

13. An ice warning sensor according to claim 12, characterized in that two annular heating-cooling elements are arranged one in the other.

14. An ice warning sensor according to claim 6, characterized in that a selective switch is present between the current sources and the Peltier elements.

15. An ice warning sensor according to claim 4, characterized in that for the early detection of a risk of ice formation, this operates alternately with a further ice warning sensor of the same type.

16. In an ice warning sensor for implementing a method according to claim 3, having a detection surface, heating-cooling elements, current sources in said heating-cooling elements, a light source for lighting the detection surface, a light measuring device for measuring light back-scattered by the detection surface, a sensor circuit comprising:

a controllable current source for one of said heating-cooling elements;

a discriminator having an input connected with said light measuring device;

means connecting the output of the discriminator with the control input of the controllable current source, an AND gate connected with the output of the discriminator, an Exclusive OR gate connected with the output of the discriminator;

a clock pulse generator connected to inputs of the AND gate and of the Exclusive OR gate; and counters connected to the output of the AND gate and Exclusive OR gate.

17. An ice warning sensor according to claim 16, characterized in that the outputs of the counters are connected to a divider.

18. An ice warning sensor according to claim 4 characterized in that the discriminators are window discriminators.

* * * * *